United States Patent
Lorenz

(10) Patent No.: US 6,168,069 B1
(45) Date of Patent: Jan. 2, 2001

(54) METHOD OF BRAZING TITANIUM TO STAINLESS STEEL

(75) Inventor: Rainer Lorenz, Lörrach (DE)

(73) Assignee: Endress +Hauser Flowtec AG, Reinach (CH)

( * ) Notice: Under 35 U.S.C. 154(b), the term of this patent shall be extended for 0 days.

(21) Appl. No.: 09/110,606

(22) Filed: Jul. 6, 1998

Related U.S. Application Data
(60) Provisional application No. 60/056,285, filed on Sep. 3, 1997.

(30) Foreign Application Priority Data

Jul. 18, 1997 (EP) .................................................. 97112357

(51) Int. Cl.[7] .............................. B23K 31/02; B23K 1/00; B23K 20/16
(52) U.S. Cl. ........................ 228/131; 228/121; 228/208; 228/262.42; 228/262.72; 428/661
(58) Field of Search .................................... 228/121, 131, 228/126, 208, 221, 262.42, 262.72; 420/502; 29/469

(56) References Cited

U.S. PATENT DOCUMENTS

| | | |
|---|---|---|
| 3,264,728 | 8/1966 | Mabry et al. ................. 29/471.1 |
| 3,919,761 * | 11/1975 | Bomberger, Jr. ................. 29/428 |
| 3,991,929 * | 11/1976 | Smith ................. 228/208 |
| 4,011,981 * | 3/1977 | Danna et al. ................. 228/208 |
| 4,585,255 * | 4/1986 | Ridenour ................. 285/93 |
| 4,714,189 * | 12/1987 | Tovey ................. 228/122 |
| 4,725,509 * | 2/1988 | Ryan ................. 428/607 |
| 4,783,997 * | 11/1988 | Lynnworth ................. 73/644 |
| 5,129,574 | 7/1992 | Tobin ................. 228/221 |
| 5,159,838 * | 11/1992 | Lynnworth ................. 73/644 |
| 5,167,725 * | 12/1992 | Clark et al. ................. 428/880 |
| 5,256,496 * | 10/1993 | Kluczynski ................. 428/661 |
| 5,669,825 * | 9/1997 | Shira ................. 473/324 |
| 5,803,553 * | 12/1998 | Wei ................. 301/63.1 |

FOREIGN PATENT DOCUMENTS

| | | |
|---|---|---|
| 1218882 | 10/1987 | (CA) . |
| 0 104 500 | 4/1984 | (EP) . |

OTHER PUBLICATIONS

Humpston et al., Soldering and Brazing, ASM International, pp. 46, 47, and 145 147, Mar. 1993.*
Keller et al., "Wettability of Brazing Filler Metals", Oct., 1990, Welding Journal, vol. 69, No. 10, pp. 31–34.*
Peaselee, Robert L., "Brazing Q & A", May, 1991, Welding Journal, vol. 70, No. 5, p. 112, Mar. 1993.*

(List continued on next page.)

* cited by examiner

Primary Examiner—Patrick Ryan
Assistant Examiner—L. Edmondson
(74) Attorney, Agent, or Firm—Bose, McKinney & Evans LLP

(57) ABSTRACT

Surprisingly, silver-copper-palladium brazing alloys, which have hitherto been used only for the brazing of components of the same material, are also very well suited for brazing directly titanium to stainless steel if, the latter component clasps the titanium component tightly, so that the cold joint is under constant compressive stress. In a method for forming the titanium-steel compound the titanium component is provided with a cylindrical end which has a smaller out-side diameter than an adjacent main portion whose external surface is a first surface to be brazed. The cylindrical steel component is a sleeve whose inside diameter is equal to the outside diameter of the main portion and whose internal surface is a second surface to be brazed. A silver-copper-palladium brazing alloy is placed around the end of the titanium component. The steel sleeve is slipped thereover. The whole is heated in a vacuum or an inert gas until the silver-copper-palladium brazing alloy melts and wets the surfaces to be brazed, and is then allowed to cool down.

23 Claims, 3 Drawing Sheets

OTHER PUBLICATIONS

Peaslee, Robert L., "Brazing Q and A", May, 1991, Welding Journal, vol. 70, No. 5, p. 112.*

Humpston, Giles et al., Soldering and Brazing, ASM International, pp. 46 and 47, Mar. 1993.*

Keller, D.L., McDonald, M.M., Heiple, C.R., Johns, W.L., and Hofmann, W.E., "Wettability of Brazing Filler Metals", Oct., 1990, Welding Journal, vol. 69, No. 10, Miami, Florida, pp. 31–34.

Peaslee, Robert L., "Brazing Q & A", May, 1991, Welding Journal, vol. 70, No. 5, Miami,Florida, p. 112.

METHOD OF BRAZING TITANIUM TO STAINLESS STEEL

This Application claims benefits to Provisional Application 60/056,285 filed Sept. 3, 1997

FIELD OF THE INVENTION

This invention deals with a novel use of silver-copper-palladium brazing alloys.

BACKGROUND OF THE INVENTION

Such brazing alloys are commercially available, cf. "Welding Journal, October 1990, pages 31 to 34, which describes, among many other brazing alloys whose ability to wet 316L steel is investigated, a 68Ag-27Cu-5Pd brazing alloy designated as "Palcusil 5", a 58Ag-32Cu-10Pd brazing alloy designated as "Palcusil 10", a 65Ag-20Cu-15Pd brazing alloy designated as "Palcusil 15", and a 54Ag-21Cu-25Pd brazing alloy designated as "Palcusil 25".

Since these silver-copper-palladium brazing alloys properly wet stainless steel, they can be used for brazing components made of this material. It is also possible, however, to braze components of titanium with these silver-copper-palladium brazing alloys.

SUMMARY OF THE INVENTION

When examining how to braze a component of titanium to a component of stainless steel, i.e. without first having to apply an intermediate layer of another metal to the steel, for instance nickel to 304L steel, cf. "Welding Journal, May 1991, page 112, the inventor first noted only that, if flat surfaces of the two components are brazed, the joint is brittle after having cooled down.

This is due to the rather different coefficients of thermal expansion of these two materials; the expansion coefficient of steel is quite a bit greater than that of titanium.

Surprisingly, however, silver-copper-palladium brazing alloys, which have hitherto been offered only for the brazing of components of the same material, are also very well suited for brazing titanium to stainless steel if, according to one feature of the invention, the second component, i.e., the component of stainless steel, clasps the first component, i.e., the component of titanium, tightly, so that the cold joint is under constant compressive stress.

Accordingly, a first variant of the invention consists in the use of silver-copper-palladium brazing alloys for brazing a first component of titanium to a second component of stainless steel which clasps the first component tightly.

A second variant of the invention provides a method for forming a compound arrangement by brazing a first component of titanium to a second component of stainless steel which clasps the first component tightly, using silver-copperpalladium brazing alloys, wherein
the first component of titanium is provided with a cylindrical first end
which has a smaller outside diameter than an adjacent main portion
whose external surface is, at least in part, a first surface to be brazed;
the second component is a cylindrical steel sleeve
whose inside diameter is equal to the outside diameter of the main portion of the first component and
whose internal surface is, at least in part, a second surface to be brazed;
a silver-copper-palladium brazing alloy is placed around the first end of the first component;
the steel sleeve is slipped over the main portion of the first component; and
the first and second components and the silver-copper-palladium brazing alloy are heated in a vacuum or an inert gas until the silver-copper-palladium brazing alloy melts and wets the surfaces to be brazed, and are then allowed to cool down;
whereby the compound arrangement is formed.

A first development of the second variant of the invention provides a method wherein
the steel sleeve has an end projecting beyond the first end of the first component of titanium;
the first component has a tapped blind hole at the first end;
a tube of stainless steel which has an outside diameter equal to the inside diameter of the steel sleeve is provided at a first end with an external thread fitting the thread of the tapped blind hole; and
the projecting end of the steel sleeve is brazed to the tube.

A second development of the second variant of the invention, which can also be used together with the first development, provides a method wherein the main portion of the first component of titanium is provided with a collar remote from the first end, said collar being covered by and serving as a stop for the steel sleeve.

A third development of the second variant of the invention, which can also be used with the first development and/or the second development, provides a method wherein
the first component of titanium is provided with an axial bore whose diameter is equal to the inside diameter of the tube of stainless steel;
a titanium tube whose outside diameter is virtually equal to the inside diameter of the tube is inserted into the tube and into the axial bore; and
the titanium tube is electrically welded to the first component in an inert-gas atmosphere.

In a preferred embodiment of the first or second variant of the invention, which can also be used with the above developments, a composition of 86.5 wt. % silver, 26.5 wt. % copper, and 5 wt. % palladium is used which is as free of residues as possible.

BRIEF DESCRIPTION OF THE DRAWINGS

The invention will now be explained in more detail with reference to the accompanying drawings, in which embodiments are shown schematically in the form of longitudinal sections, and in which like reference characters have been used to designate like parts. In a figure following a figure in which a reference character appeared for the first time, this reference character is not shown again.

DETAILED DESCRIPTION OF THE INVENTION

Figure 1:
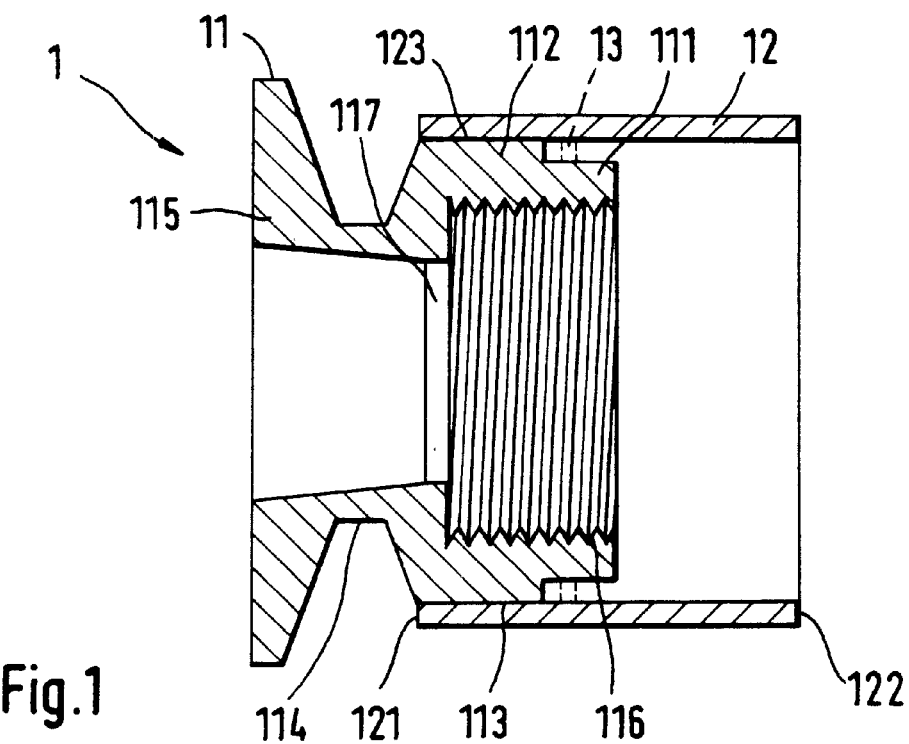
FIG. 1 shows a compound arrangement formed according to the second variant of the invention.

FIG. 1 shows a compound arrangement 1 of a first component 11 of titanium and a second component of stainless steel in a sectional view. According to the second variant of the invention, compound arrangement 1 was formed by brazing with a silver-copper-palladium brazing alloy.

For this purpose, component 11 was provided with a cylindrical first end 111 which has a smaller outside diameter than an adjoining main portion 112. The external surface 113 of the latter is, at least in part, a first surface to be brazed; in FIG. 1 this is the entire external surface 113. The main portion is followed, via a constriction 114, by an integral flange 115.

At its end 111, component 11 is provided with a tapped blind hole 116 which extends into main portion 112. From end 111, component 11 was provided with an axial bore 117; its function and the functions of flange 115 and tapped blind hole 116 are explained below.

The second component is a cylindrical steel sleeve 12 whose inside diameter is equal to the outside diameter of main portion 112 of component 11, and whose internal surface 123 is, at least in part, a second surface to be brazed; in FIG. 1, this is the surface touching external surface 113 of component 11.

A first end 121 of steel sleeve 12 terminates at the beginning of constriction 114, while a second end 122 projects beyond the end of component 11. This is by no means mandatory: Steel sleeve 12 may also be flush with or recede from end 111.

To form the compound arrangement, steel sleeve 12 is slipped over main portion 112 of component 11, i.e., the outside diameter of the main portion is slightly less than the inside diameter of the steel sleeve, so that the latter can be easily slipped on. Thus, in this condition, steel sleeve 12 encloses component 11 without clasping it tightly for the time being.

After steel sleeve 12 has been slipped on, a silver-copper-palladium brazing alloy 13 is placed around the first end 111 of component 11, as indicated by broken lines. The amount of brazing alloy 13 is chosen to be sufficient for brazing the two surfaces 113, 123. Brazing alloy 13 may take the form of a prefabricated silver-copper-palladium wire, a corresponding ribbon, or a corresponding paste.

A silver-copper-palladium brazing alloy which has proved especially suitable is a composition of 68.5 wt. % silver, 26.5 wt. % copper, and 5 wt. % palladium which is as free of residues as possible.

The arrangement consisting of component 11, steel sleeve 12, and silver-copper-palladium brazing alloy 13 is then heated in a vacuum or an inert gas, since titanium oxidizes quickly when heated, until the brazing alloy melts and penetrates into the gap between the surfaces to be brazed and wets these surfaces as completely as possible. Then the arrangement is allowed to cool down, so that steel sleeve 12 clasps component 11 tightly. The formation of compound arrangement 11 is thus completed.

Figure 2:
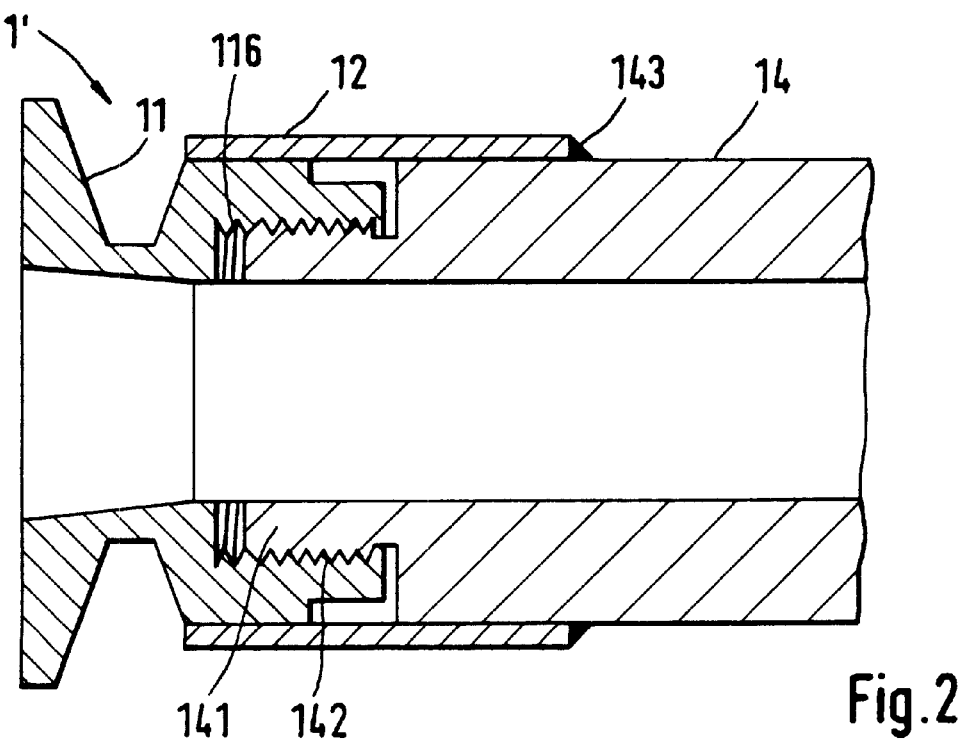
FIG. 2 shows a compound arrangement formed according to the above first development.

FIG. 2 shows a sectional view of a compound arrangement 1' formed according to a development of the method explained with reference to FIG. 1. A tube 14 of stainless steel which was provided at a first end 141 with an external thread 142 fitting the thread 116 of the tapped blind hole was screwed into the blind hole. Tube 14 has an outside diameter equal to the inside diameter of steel sleeve 12. The projecting end 122 of steel sleeve 12 was welded to tube 14, as illustrated by a weld 143.

Figure 3:
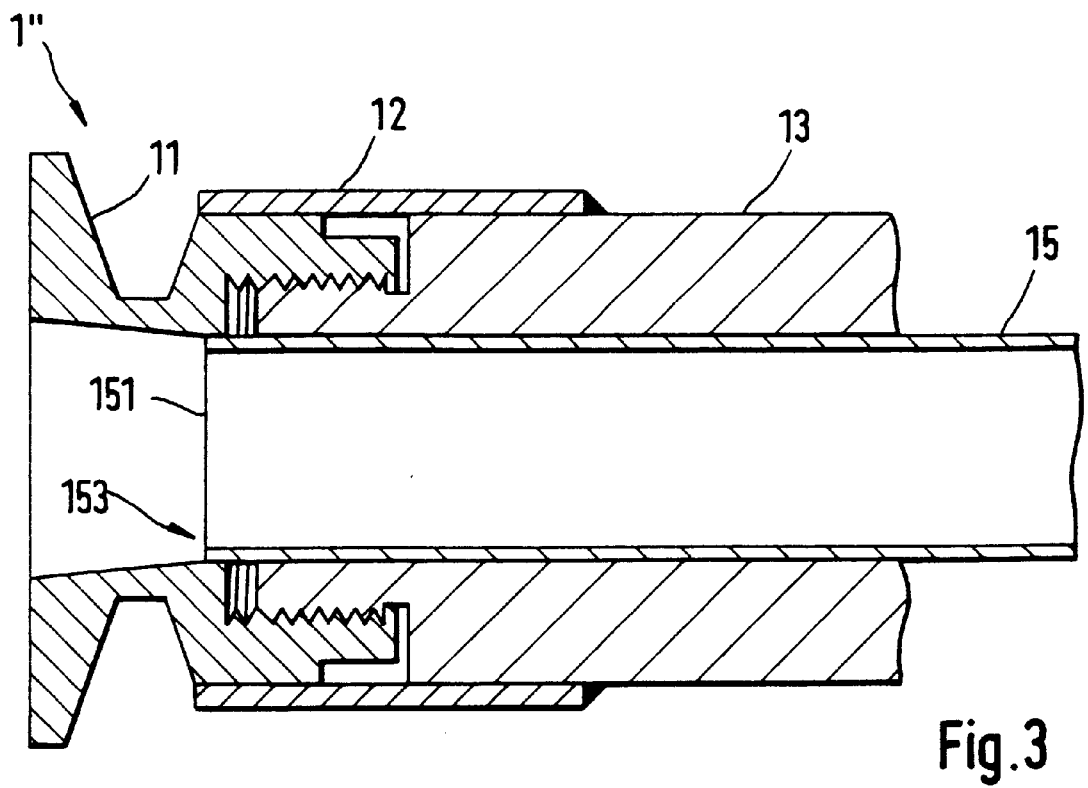
FIG. 3 shows compound arrangement formed according to the above third development.

FIG. 3 shows a sectional view of a compound arrangement 1" formed according to another development of the method explained with reference to FIGS. 1 and 2. A titanium tube 15 whose outside diameter is virtually equal to the inside diameter of tube 13 was inserted into axial bore 117. A first end 151 of titanium tube 15 was electrically welded at 153 to component 11 in an inert-gas atmosphere.

Figure 4:
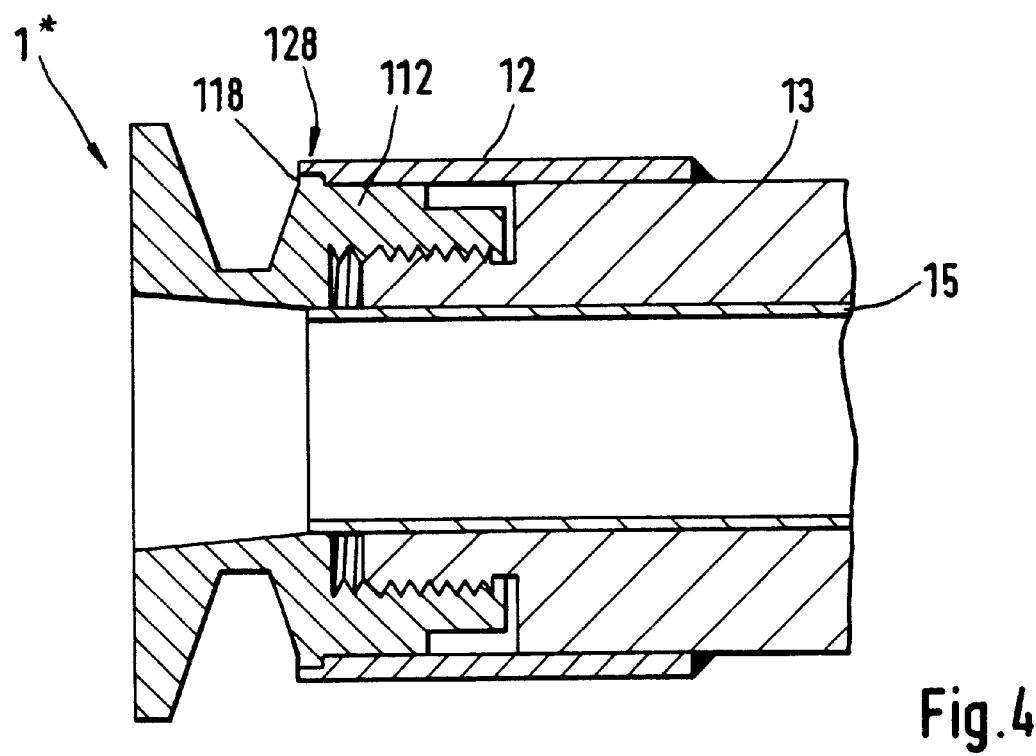
FIG. 4 shows compound arrangement formed according to the above second and third developments.

FIG. 4 shows a cross-sectional view of a compound arrangement 1* formed according to still another development of the method explained with reference to FIGS. 1 to 3. Main portion 112 of component 11 of titanium was provided with a collar 118 remote from first end 111. Collar 118 is covered by steel sleeve 12 and serves as a stop for the latter. To this end, steel sleeve 12 was provided with a recess 128 which fits collar 118.

Figure 5:
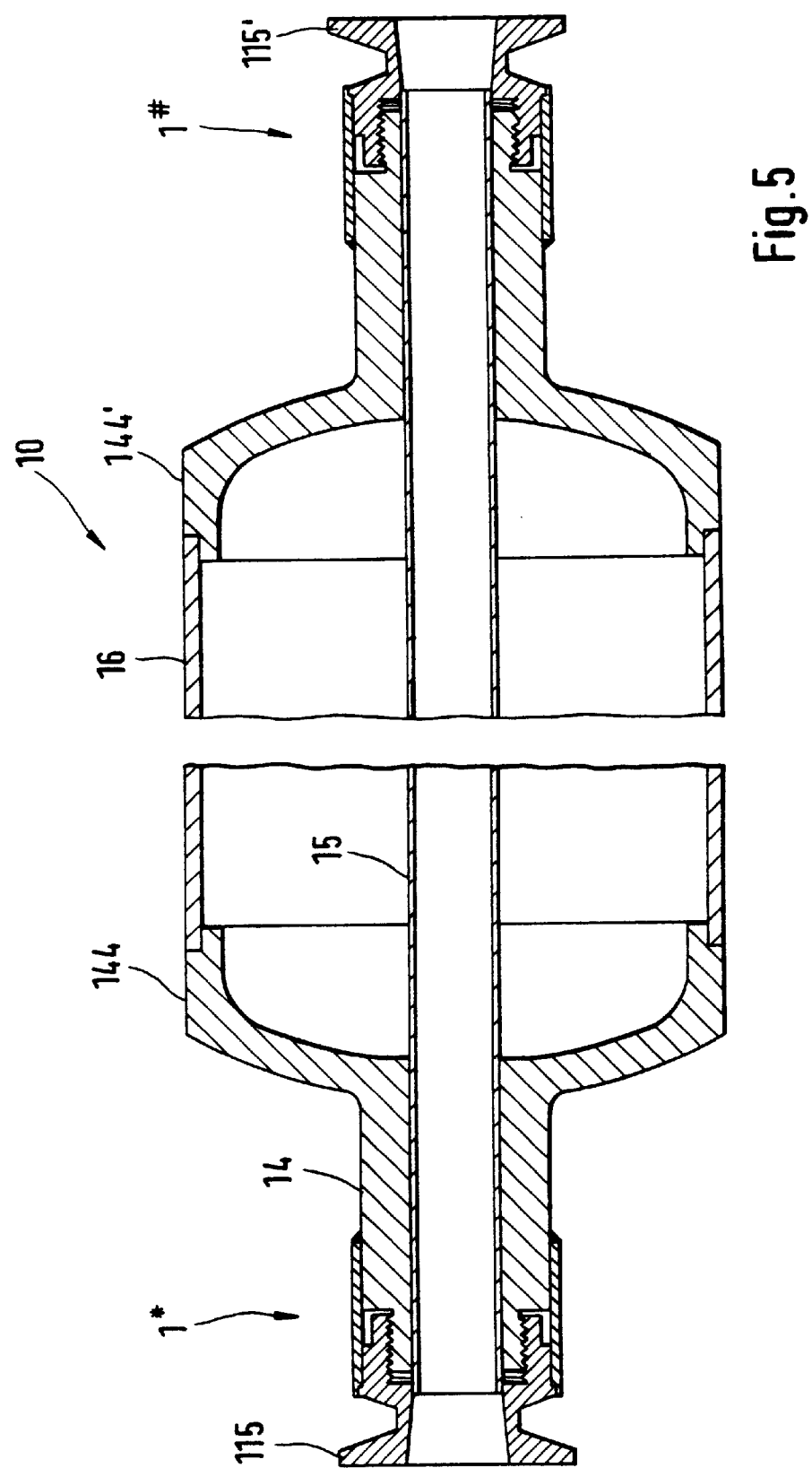
FIG. 5 shows the use of the second variant of the invention in a single-tube Coriolis mass flow sensor.

FIG. 5 shows a cross-sectional view of a single-tube Coriolis mass flow sensor 10 in which the second variant of the invention, shown in FIGS. 1 to 4, was used to advantage twice. Tube 14 of compound arrangement 1* expands into a funnel-like end portion 144 having a greater diameter than tube 14. A compound arrangement 1# which is symmetrical with respect to compound arrangement 1* has a funnel-like end portion 144'. End portions 144, 144' are permanently connected with one another by a support tube 16, for example by being welded to the support tube all around. For this purpose, end portions 144, 144' are so designed that support tube 16 can be slip-fitted to them and that the external surfaces of end portions 144, 144' are flush with the external surface of support tube 16.

The diameter of end portion 144, which is greater than the diameter of tube 14, is chosen so that the resulting hollow space can serve to mount an exciter assembly and sensors etc. on titanium tube 15. These, as is well known, are necessary for a Coriolis mass flow sensor but have been omitted in FIG. 5 for clarity.

By using the invention with a single-tube Coriolis mass-flow sensor, which, as is usual and as shown in FIG. 5, is provided with titanium tube 15 as a vibrating measuring tube, very good joints can be produced between support tube 16 of stainless steel and flange 115 of titanium and between titanium tube 15 and flange 115.

These joints between titanium and titanium and between titanium and steel are necessary since both the junction between titanium tube 15 and (titanium) flange 115 and the junction between steel tube 14 and (titanium) flange 115 must remain tight under all operating conditions, particularly in case of changes in temperature. This is guaranteed, since the maximum permissible operating temperature of Coriolis mass flow sensor 10 is far below the temperature of the above-explained brazing.

By means of flange 115 and the corresponding flange 115' at compound arrangement 1#, the single-tube Coriolis mass-flow sensor 10 can be installed in a pipe conducting the fluid to be measured fluid-tight.

The invention can be used to particular advantage in a single-tube coriolis mass flow sensor with a cantilever mass as is described in the prior U.S. Provisional Applications S/N 60/032,906 filed Dec. 16, 1996, and S/N 60/036,192 filed Jan. 21, 1997 as well as the corresponding U.S. Non-Provisional Application S/N 08/940,644 filed Sep. 30, 1997 which are incorporated herein by reference.

What is claimed is:

1. A method for forming a compound arrangement by brazing a first component of titanium to a second component of unplated stainless steel using silver-copper-palladium brazing alloys, wherein the first component of titanium is provided with a cylindrical first end which has a smaller outside diameter than an adjacent main portion
whose external surface is, at least in part, a first surface to be brazed;
the second component is a cylindrical steel sleeve
whose inside diameter is equal to the outside diameter of the main portion of the first component and
whose internal surface is, at least in part, a second surface to be brazed the second surface being unplated stainless steel;
a silver-copper-palladium brazing alloy is placed around the first end of the first component;
the steel sleeve is slipped over the main portion of the first component;
the first and second components and the silver-copper-palladium brazing alloy are heated in a vacuum or an inert gas until the silver-copper-palladium brazing alloy melts and wets the surface to be brazed; and
the first and second components and the brazing alloy are then cooled so that the steel sleeve exerts compressive stress on the first surface of titanium and is brazed directly to the first surface of titanium;
whereby the compound arrangement is formed.

2. A method as claimed in claim 1 wherein
the steel sleeve has an end projecting beyond the first end of the first component of titanium;
the first component has a tapped blind hole at the first end;
a tube of stainless steel which has an outside diameter equal to the inside diameter of the steel sleeve is provided at a first end with an external thread fitting the thread of the tapped blind hole; and
the projecting end of the steel sleeve is brazed to the tube.

3. A method as claimed in claim 1 wherein the main portion of the first component of titanium is provided with a collar remote from the first end, said collar being covered by and serving as a stop for the steel sleeve.

4. A method as claimed in claim 2 wherein the main portion of the first component of titanium is provided with a collar remote from the first end, said collar being covered by and serving as a stop for the steel sleeve.

5. A method as claimed in claim 2 wherein
the first component of titanium is provided with an axial bore whose diameter is equal to the inside diameter of the tube of stainless steel;
a titanium tube whose outside diameter is virtually equal to the inside diameter of the tube is inserted into the tube and into the axial bore; and
the titanium tube is electrically welded to the first component in an inert-gas atmosphere.

6. A method as claimed in claim 3 wherein
a tube of stainless steel which has an outside diameter equal to the inside diameter of the steel sleeve is provided at a first end with an external thread fitting the thread of the tapped blind hole;
the first component of titanium is provided with an axial bore whose diameter is equal to the inside diameter of the tube of stainless steel;
a titanium tube whose outside diameter is virtually equal to the inside diameter of the tube is inserted into the tube and into the axial bore; and
the titanium tube is electrically welded to the first component in an inert-gas atmosphere.

7. A method as claimed in claim 1 wherein the silver-copper-palladium brazing alloy has a composition of 68.5 wt. % silver, 26.5 wt. % copper, and 5 wt. % palladium and is as free from residues as possible.

8. A method as claimed in claim 2 wherein the silver-copper-palladium brazing alloy has a composition of 68.5 wt. % silver, 26.5 wt. % copper, and 5 wt. % palladium and is as free of residues as possible.

9. A method as claimed in claim 3 wherein the silver-copper-palladium brazing alloy has a composition of 68.5 wt. % silver, 26.5 wt. % copper, and 5 wt. % palladium and is as free of residues as possible.

10. A method as claimed in claim 4 wherein the silver-copper-palladium brazing alloy has a composition of 68.5 wt. % silver, 26.5 wt. % copper, and 5 wt. % palladium and is as free of residues as possible.

11. A method as claimed in claim 5 wherein the silver-copper-palladium brazing alloy has a composition of 68.5 wt. % silver, 26.5 wt. % copper, and 5 wt. % palladium and is as free of residues as possible.

12. A method of brazing titanium directly to unplated stainless steel, the method comprising the steps of:
a) providing a first surface of titanium to be brazed;
b) providing a second surface of unplated stainless steel to be brazed;
c) forming with the first surface of titanium and the second surface of unplated stainless steel a cold joint;
d) applying a brazing alloy adjacent to the cold joint;
e) heating the cold joint and brazing alloy so that the brazing alloy melts and penetrates into the cold joint between the surfaces to be brazed and wets the surfaces; and
f) cooling the cold joint and brazing alloy so that the second surface of unplated stainless steel exerts compressive stress on the first surface of titanium and is brazed directly to the first surface of titanium.

13. The method of claim 12, wherein the cold joint and brazing alloy are heated in a vacuum.

14. The method of claim 12, wherein the cold joint and brazing alloy are heated in an inert gas.

15. The method of claim 14, wherein the brazing alloy is a silver-copper-palladium brazing alloy.

16. A method of brazing titanium directly to unplated stainless steel, the method comprising the steps of:
a) providing a first surface geometry of titanium to be brazed;
b) providing a second surface geometry of unplated stainless steel to be brazed, the second surface geometry of unplated stainless steel selected to form a cold joint under compressive stress with the first surface geometry of titanium when the geometries are cooling after heating; and
c) forming with the first surface geometry of titanium and the second surface geometry of unplated stainless steel a cold joint.

17. The method of claim 16, further comprising the step of applying a brazing alloy adjacent to the cold joint.

18. The method of claim 17, further comprising the step of heating the cold joint and brazing alloy, whereby the brazing alloy melts and penetrates into the cold joint between the surfaces to be brazed and wets the surfaces such that the first surface geometry of titanium is brazed directly to the second surface geometry of unplated stainless steel.

19. The method of claim 18, wherein the first surface geometry of titanium to be brazed is the outer surface of a titanium cylinder.

20. The method of claim 19, wherein the second surface geometry of unplated stainless steel to be brazed is the inner surface of a stainless steel cylinder.

21. The method of claim 20, wherein the cold joint and brazing alloy are heated in a vacuum.

22. The method of claim 21, wherein the cold joint and brazing alloy are heated in an inert gas.

23. The method of claim 21, wherein the brazing alloy is a silver-copper-palladium brazing alloy.

* * * * *